United States Patent [19]
Oosterom

[11] Patent Number: 5,826,729
[45] Date of Patent: Oct. 27, 1998

[54] CABINET OR CD STORAGE RACK WITH INDIVIDUAL COMPARTMENTS

[76] Inventor: Cornelis Oosterom, NL-4225 PH, Noordeloos, Noordzijde 36, Netherlands

[21] Appl. No.: 716,489

[22] Filed: Sep. 18, 1996

[51] Int. Cl.[6] .................................................. A47F 7/00
[52] U.S. Cl. ........................... 211/40; 211/10; 211/88.01; 211/90.04; 312/245
[58] Field of Search ................ 211/40, 10, 90.04, 211/88.01, 50, 194, 74, 75, 72, 189; 312/245

[56] References Cited

U.S. PATENT DOCUMENTS

| | | | |
|---|---|---|---|
| D. 239,244 | 3/1976 | Lubge | D7/701 X |
| 287,430 | 10/1883 | Golding | 211/10 X |
| 1,343,423 | 6/1920 | Todd | 211/10 X |
| 3,887,076 | 6/1975 | Larsen | 211/50 X |
| 4,095,858 | 6/1978 | Hopf | 211/194 X |
| 4,247,011 | 1/1981 | Walter | 211/194 |
| 4,567,989 | 2/1986 | Hurst | 211/194 X |
| 5,497,888 | 3/1996 | Michaels et al. | 211/50 X |

FOREIGN PATENT DOCUMENTS 875562  5/1953  Germany ................................ 211/74

*Primary Examiner*—Robert W. Gibson, Jr.
*Attorney, Agent, or Firm*—Knobbe, Martens, Olson & Bear, LLP

[57] ABSTRACT

An attractive design for a cabinet or a storage rack for CD cassettes that makes it possible for the CD cassettes to be stored toward the left or toward the right in tilted, stand-in adjacent compartments, wherein each case is partitioneed into a number of rectangular compartments positioned in the housing in such a way that as a result, the CD cassettes are maintained by their own weight in a tilted arrangement in respective compartments or in the CD storage rack.

18 Claims, 5 Drawing Sheets

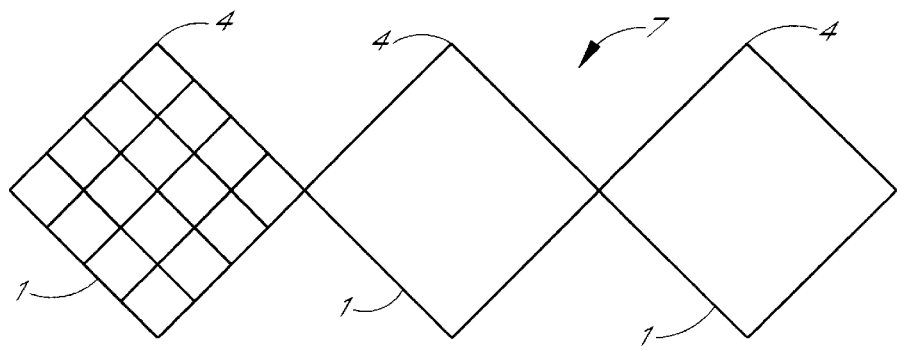
FIG. 2
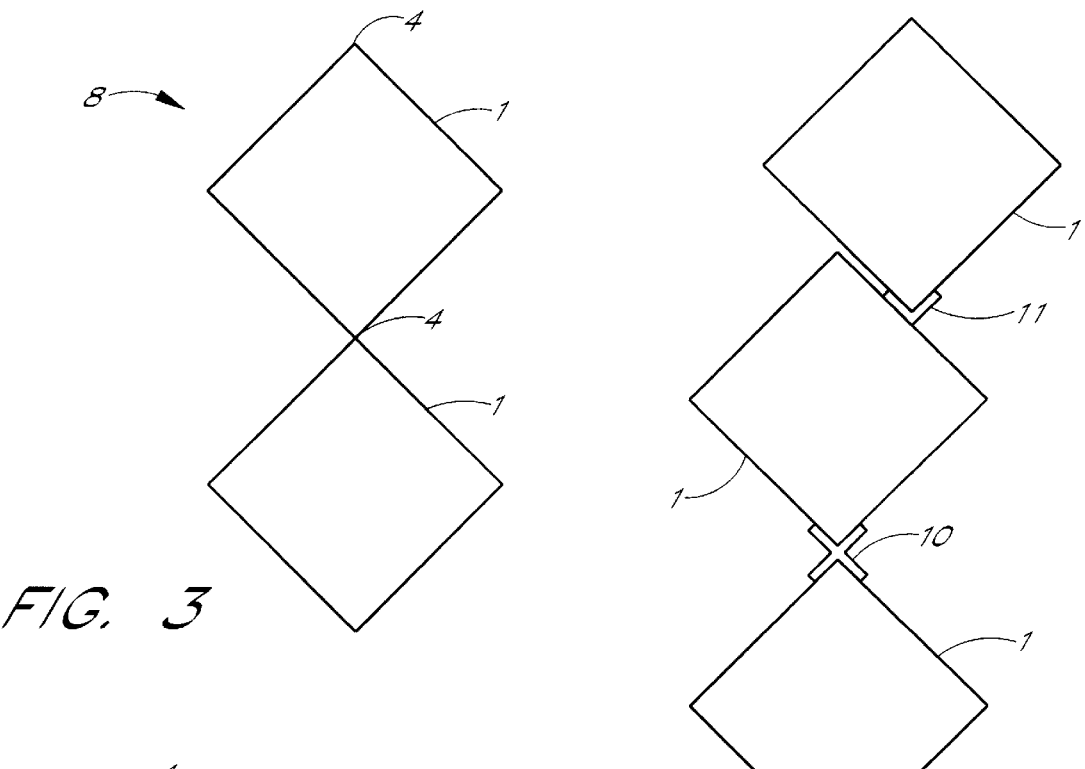
FIG. 3
FIG. 5
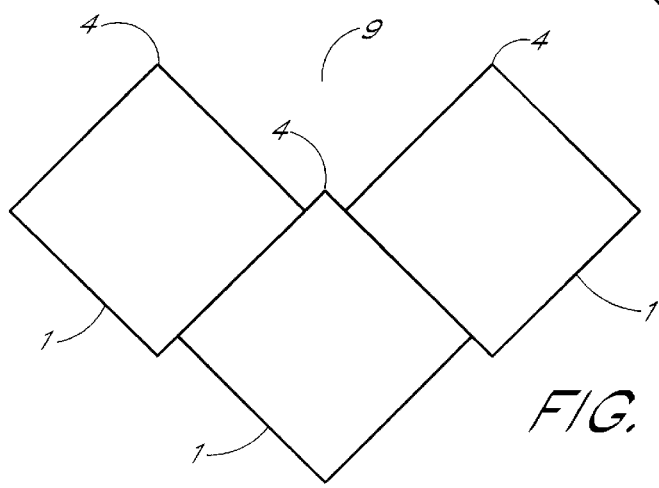
FIG. 4

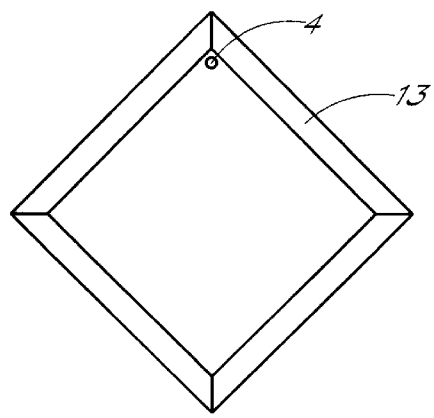
FIG. 6
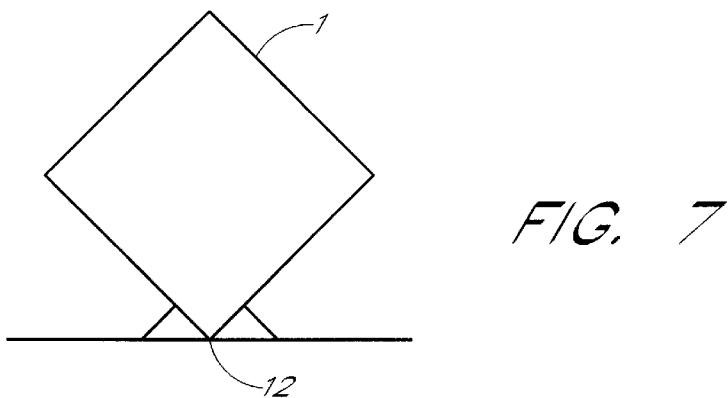
FIG. 7
FIG. 8
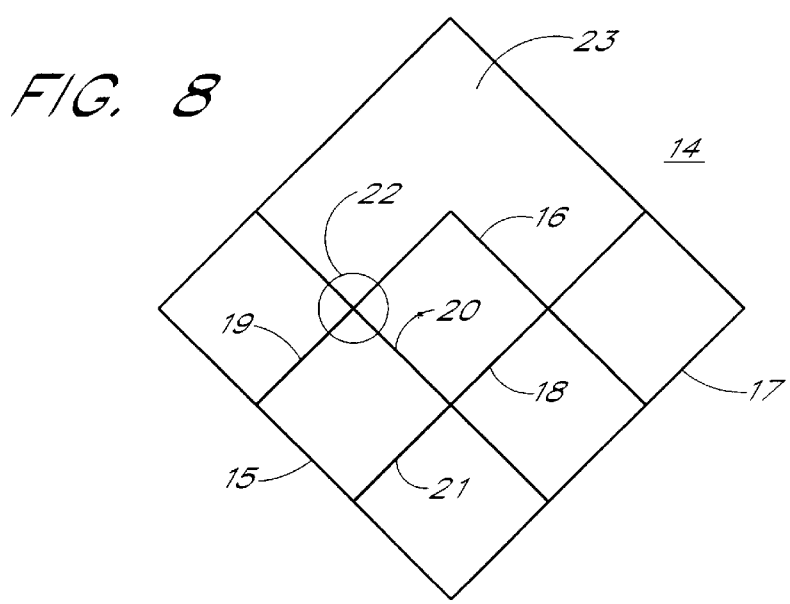

CABINET OR CD STORAGE RACK WITH INDIVIDUAL COMPARTMENTS

FIELD OF THE INVENTION

The invention relates to a cabinet or a storage rack for CD cassettes.

BACKGROUND OF THE INVENTION

As is generally known, CD cassettes or video cassettes are placed upright side-by-side in a cabinet on horizontal racks. Usually the cabinet is a housing with vertical partitioning into several compartments (sections) in which the CD cassettes are to be stored vertically.

SUMMARY OF THE INVENTION

The invention proposes a new, attractive design of a cabinet that makes it possible for the CD cassettes to be stored toward the left or toward the right in tilted stand in adjacent compartments. This is made possible in that in each case, a rectangular compartment is positioned in the housing in such a way that as a result, the CD cassettes are maintained by their own weight in a tilted arrangement in the compartment or in the CD storage rack.

Although according to its design, a rectangular cabinet is intended and thus combinations thereof in zigzag are also possible, a preferred form of execution is one with square compartments and the diagonal plane, in which are situated at any time a pair—top and bottom—of a compartment's vertexes opposite each other, is even with a vertical plane.

In this way, a square cabinet module is created in each case, whereby countless variants can be worked out, for example depending on whether 4, 9, 16 or more compartments are required per module, but also in combination with larger sections, as are required for video cassettes.

In addition, it is possible for identical, smaller and/or larger cabinet module units with several sections to be coupled together, whether horizontally or vertically and/or whether something with tiles in a desired connection or structure is desired. In this regard, for example, coupling elements can be formed by commercially available profile sections in cross form (in the case of vertex coupling) or only in angular form (in the case of attachment of a vertex) on the middle of the adjacent side wall of a housing. When using CD module units that can be dismantled, it can be useful, instead of using coupling profile sections to form two storage racks able to be coupled together, to simply extend the side walls of two adjacent housings able to be dismantled, so that less material is thus needed.

If geometric cabinet and/or storage rack forms are desired, various CD module units can be combined with each other and the ability to be dismantled for shipping of the various preforms for a combination CD storage rack is then certainly also preferred.

Furthermore, it is intended that the visible edges of the CD storage racks can be provided with decorative frames of any known, desired type (as in the case of an old and/or modern painting). In addition, if the CD storage rack is not suspended but rather, for example, placed on the floor, with a square design, support elements in equal-sided triangle form, for example, are certainly preferable.

BRIEF DESCRIPTION OF THE DRAWINGS

Examples of execution according to the invention are shown in the drawings.

FIG. 2 shows a horizontal arrangement of three CD storage rack modules;

FIG. 3 shows, in diagram form, another geometric arrangement of various CD storage rack modules;

FIG. 4 shows, in diagram form, another geometric arrangement of various CD storage rack modules;

FIG. 5 shows, in diagram form, the use of two different coupling profile sections;

FIG. 6 shows a CD storage rack according to the invention, provided with a decorative frame;

FIG. 7 shows a horizontal arrangement of a CD storage rack with two support units; and FIG. 8 shows a design with several CD storage rack module units according to the invention.

DETAILED DESCRIPTION OF THE PREFERRED EMBODIMENT

Figure 1:
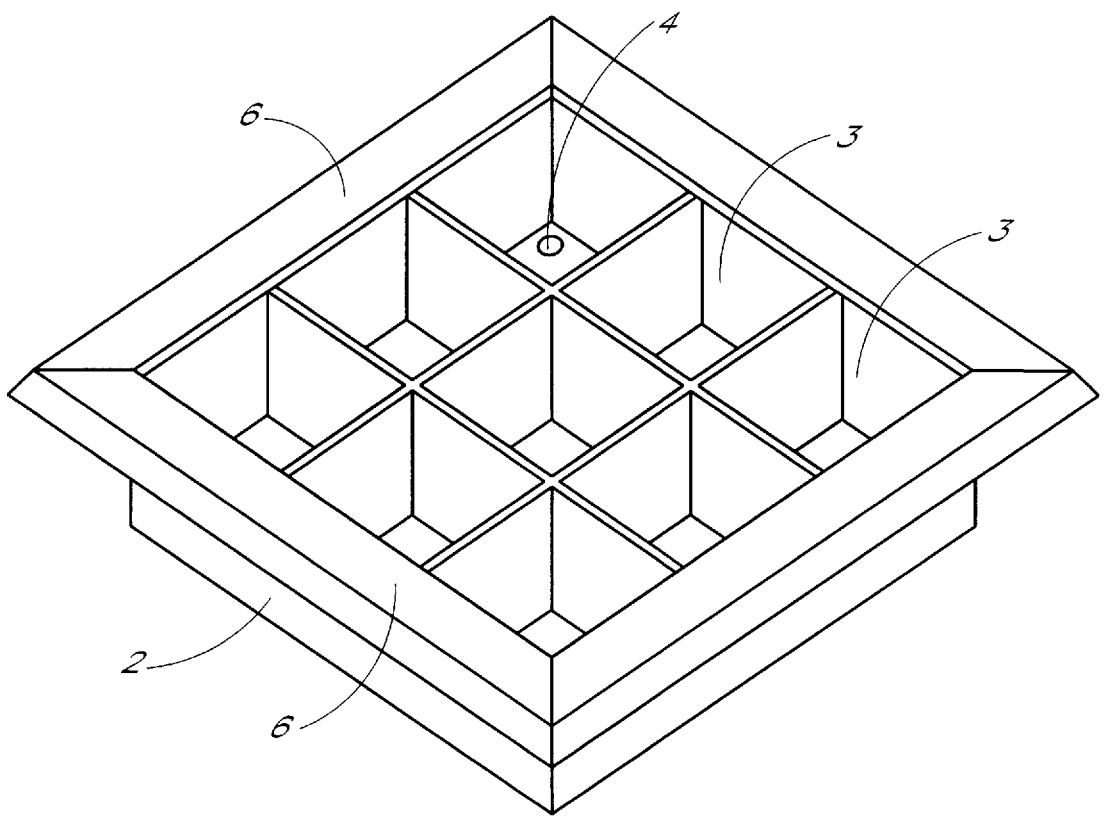
FIGS. 1 through 1C are diagrammatic illustrations in perspective of a CD storage rack module (or video cassette module) in square form with or without decorative frame.
Figure 1A:
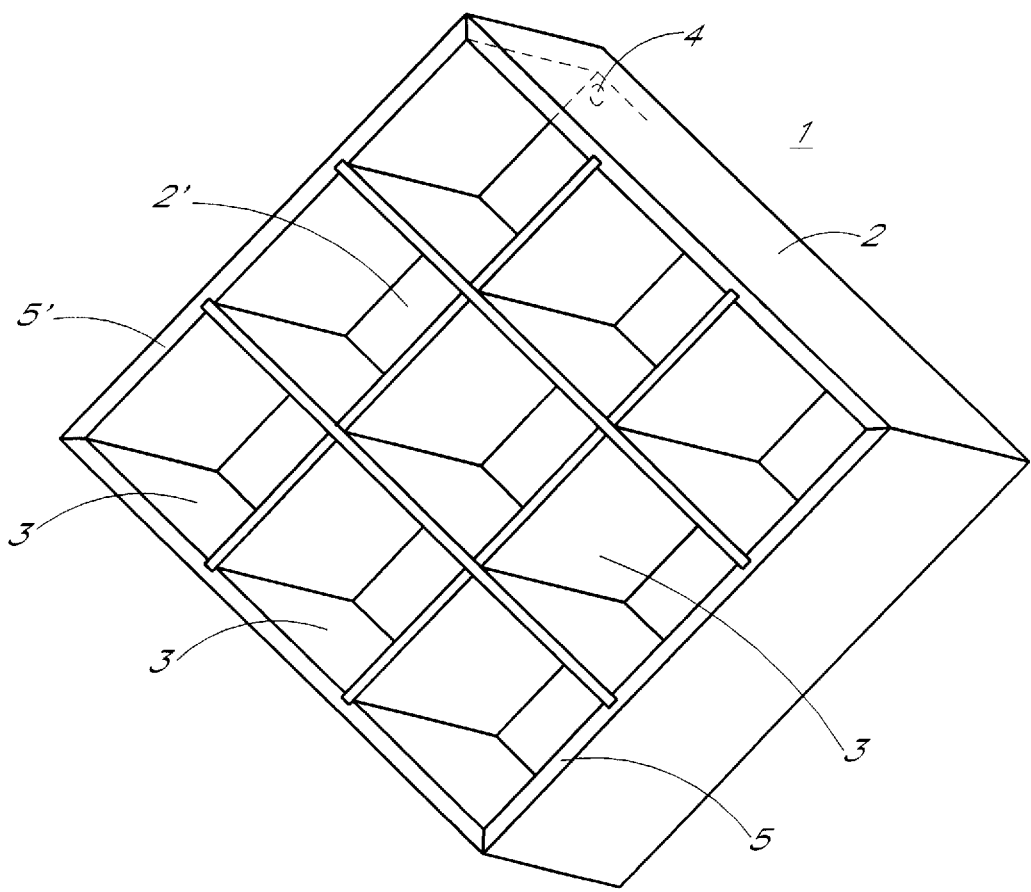
Figure 1B:
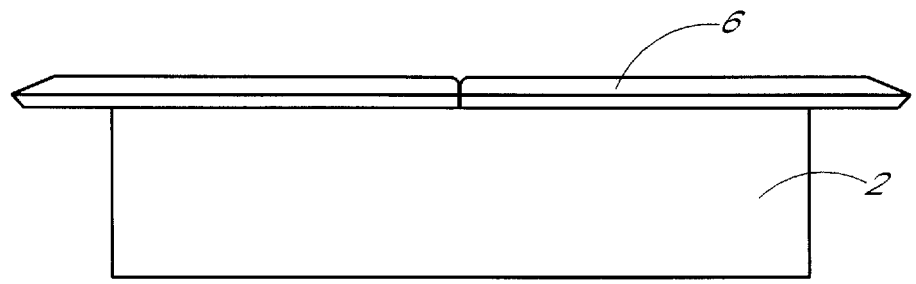
Figure 1C:
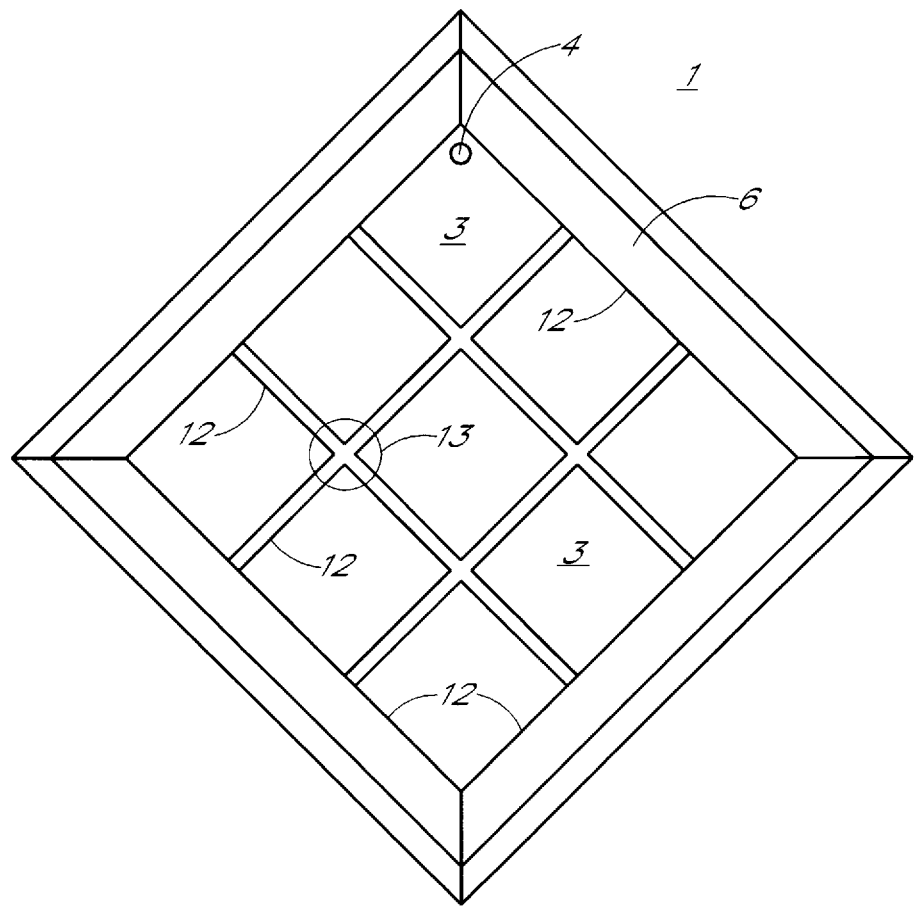

FIGS. 1 and 1a show a CD storage rack module consisting in its basic form of a shallow square housing 2. The housing 2 can be provided with a rear wall 2', although this is not always absolutely necessary. A wall from which the CD storage rack is suspended, for example, can serve as rear wall. The housing 2 is provided on its inside with a square partitioning into square compartments or sections for storing a number of typical CD cassettes (not shown).

The CD storage rack is suspended in its vertex 4 from a wall and/or supported on its vertex on a level plane (FIG. 7).

The basic form is also suitable for installation; moreover, it is normally fastened, protruding, on a wall. For installation as well as when mounting, with respect to the wall, the visible edges 5 of a CD storage rack 1 are provided with decorative frames 6 as are typical for paintings, for example.

In FIGS. 2–4, a few storage rack housings 1 are arranged horizontally schematically side-by-side or vertically stacked in a possible configuration 7, 8 or 9. Although each rack 1 can be suspended in its own vertex, profile sections 10 and 11, as shown in FIG. 5, are also provided for the mutual coupling between adjacent racks. For this purpose, one can use commercially available profile sections 10/11, for example of aluminum or plastic, in colors or anodized, or the like.

Furthermore, the walls 12 of the individual sections for the cassettes can themselves be designed in colors, e.g., in the so-called Mondriaan colors (red, blue, yellow, white). As is familiar with cardboard packaging boxes with sections, the partitions can be designed able to be dismantled, by providing the wall parts, over one half, with incisions (not shown), and two different wall parts can then be alternately connected with each other by means of the incisions to form a corner connection 13 each time.

It is clear that the sections 3 for the CD cassettes correspond to the relevant CD dimensions, and the same applies to the dimensions of the sections to be used for video cassettes. So the expression "CD cassettes" is not limited only to the use of the storage rack for compact discs, but rather also comprises the use of cassettes of any kind. It is also entirely possible to provide, in the same storage rack, sections 3 of different dimensions for different kinds of cassettes, e.g., CD cassettes and video cassettes.

According to FIGS. 2–5, combinations are illustrated that can be assembled with the help of a module CD storage rack 1 and whereby the suspension takes place by means of the uppermost vertex on a module. In the event that the user wishes to create several couplings between adjacent CD storage racks and, in the process, does not wish to attach a vertex to the wall by means of a suspension element each time, one can attach commercially available profile sections 10 and 11, two of which are shown in diagram form in FIG. 5, for example, that ensure a stable attachment.

The same profile sections can possibly also be used for stable arrangement of a storage rack module 1 on a level plane, whereby the module is stabilized on its lowest vertex 12 and is held by the profile sections fastened with screws. But this position can also be effectuated in FIG. 7, preferably by means of two equally large, or also by two different-sized triangular support elements. Furthermore, it is provided that commercially available decorative frame profile sections (FIGS. 8, 13) are attached onto the visible edges of the storage racks 1 at the periphery, as are often used with paintings, for example. Such profile sections 13 can be very different, but offer the user an additional desired shaping.

At the same time, it should be provided that the projecting inner walls of the CD sections can be designed in colors. In FIG. 8, in an illustration in diagram form of a module 14 for a specific CD storage rack, the different walls 15–21 are possible in several colors, e.g., as was already mentioned previously, in the Mondriaan basic colors (red, black, yellow and blue), whereby the corner connections 22 of the different sections are achieved mutually by incisions in a wall part. In this regard, it is noteworthy that an uppermost section 23 is L-shaped, e.g., for storing video cassettes. Numerous other combination arrangements can be used without departing from the principle of the invention.

Wood, plastic, glass and/or metal are suitable as material for the storage rack, entirely but also in a combination thereof.

What is claimed is:

1. A storage rack for cassettes, comprising:
   an outer, shallow, box-like housing having an open front face and four side walls joined at corners with an uppermost corner located above the remaining corners relative to a vertical axis;
   a plurality of partitions placed within the housing and defining a plurality of compartments within the housing and open to said front face, the partitions being provided in rows perpendicular to one another to provide a crossing pattern and define generally diamond-shaped compartments so that cassettes placed within the compartments are tilted, the compartments being sized to correspond to dimensions of the CD cassettes in order to receive CD cassettes side-by-side in each compartment so that the CD cassettes, due to their own weight, are in a tilted arrangement when placed in the compartments; and
   a frame extending along and outwardly from the periphery of the open front face of the housing.

2. The storage rack of claim 1, wherein the partitions are removable to reconfigure the storage rack for various size cassettes.

3. The storage rack of claim 1, comprising:
   a first plurality of partitions having incisions at spaced intervals, said first plurality of partitions being oriented in parallel with a first diagonal within said housing and positioned so that said incisions are facing toward said front face; and
   a second plurality of partitions having incisions spaced at intervals identical to the intervals of the incisions in the first plurality of partitions, said second plurality of partitions being oriented in parallel with a second diagonal perpendicular to said first diagonal and positioned so that said incisions are facing away from said front face, wherein the incisions on the first and second plurality of partitions are registered to connect the first and second plurality of partitions together.

4. A storage rack for CD cassettes having predetermined dimensions, comprising a shallow, diamond shaped housing having four side walls joined at vertices with an uppermost vertex located above the remaining vertices relative to a vertical axis, the housing having a plurality of interior partitions arranged to form a number of smaller diamond shaped compartments that are sized to correspond to the CD cassette dimensions to receive CD cassettes side-by-side in each compartment so that the CD cassettes, due to their own weight, are in a tilted arrangement when placed in the compartments, the housing having a frame extending outward from and around a front periphery of the housing.

5. A storage rack according to claim 4, wherein the housing is square and the bottom-most and upper-most vertices are vertically aligned.

6. A storage rack according to claim 5, wherein the interior partitions are formed with cooperative incisions at the intersections of the partitions like a cardboard packaging box to allow the partitions to be disassembled.

7. A CD storage rack according to claim 5, wherein at least two of the interior partitions are provided with incisions, whereby the partitions can be connected with each other by means of the incisions.

8. A CD storage rack according to claim 6, further comprising a rear wall connected to the housing to cover a rear face of the storage rack.

9. A storage rack according to claim 8 further comprising a wall of a structure and a fastener at the uppermost vertex of the rack connecting the storage rack to the wall.

10. A storage rack according to claim 8, further including at least one triangular support unit cooperating with a bottommost vertex of the storage rack to support the rack on a floor.

11. A storage rack for CD cassettes having dimensions, comprising a shallow, diamond shaped housing having four side walls joined at vertices with an uppermost vertex located above the remaining vertices relative to a vertical axis, the housing having a plurality of interior partitions arranged to form a number of smaller diamond shaped compartments that are sized to correspond to the CD cassette dimensions to receive CD cassettes side-by-side in each compartment so that the CD cassettes, due to their own weight, are in a tilted arrangement when placed in the compartments, the housing having a frame extending outward from and around a front periphery of the housing.

12. A storage rack according to claim 11, wherein the housing is square and the bottom most and upper-most vertices are vertically aligned.

13. A storage rack according to claim 11, further comprising a wall of a structure and a fastener at the uppermost vertex of the rack connecting the storage rack to the wall.

14. A storage rack according to claim 11, further including at least one triangular support unit cooperating with a bottommost vertex of the storage rack to support the rack on a floor.

15. A storage rack according to claim 11, wherein the interior partitions are formed with cooperative incisions at the intersections of the partitions like a cardboard packaging box to allow the partitions to be disassembled.

16. A storage rack according to claim 11, wherein at least two of the interior partitions are provided with incisions, whereby the partitions can be connected with each other by means of the incisions.

17. A storage rack according to claim 11, further comprising a rear wall connected to the housing to cover a rear face of the storage rack.

18. A storage rack according to claim 11, wherein the storage rack comprises a first storage rack, and further comprising a second storage rack having the same construction as the first storage rack and connected to the first storage rack by a connector interposed between the uppermost vertex of the first rack and a lowermost vertex of the second rack.

\* \* \* \* \*